Figure 1:
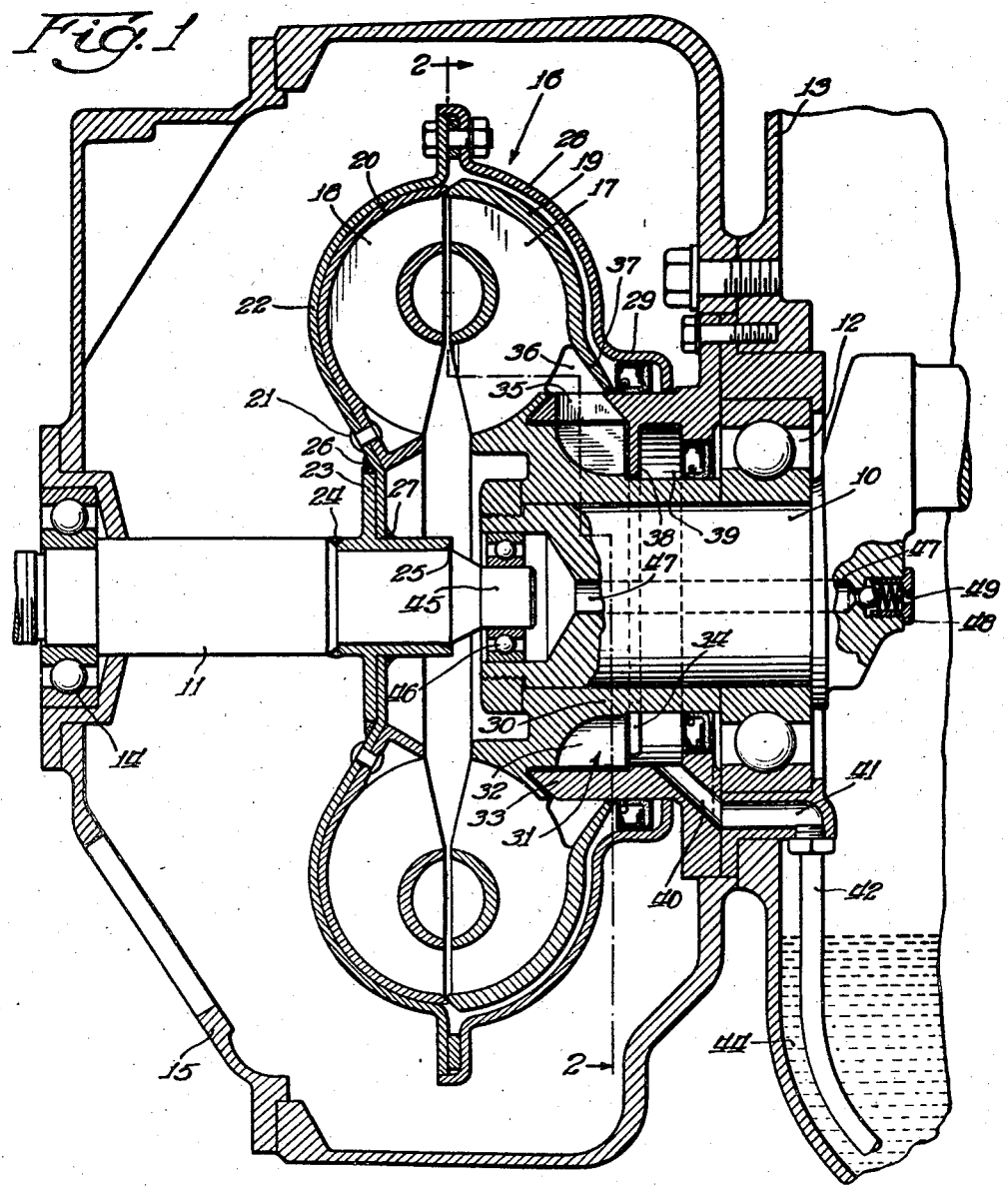

June 18, 1946.  R. A. CARLSON ET AL  2,402,369
HYDRAULIC COUPLING
Original Filed March 6, 1940   2 Sheets-Sheet 1

Inventors:
Raymond A. Carlson and
Benjamin A. Swennes.
By Edward C. Fitzbaugh
Atty.

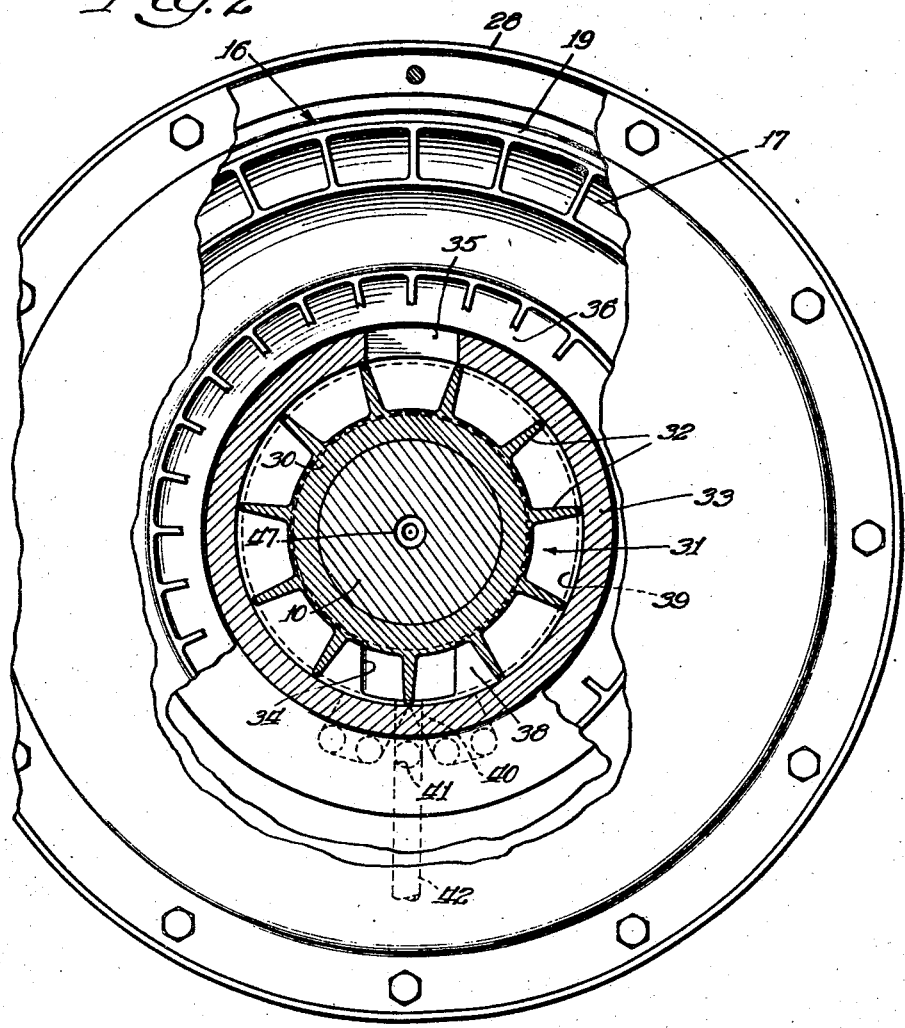

Patented June 18, 1946

2,402,369

UNITED STATES PATENT OFFICE 2,402,369

HYDRAULIC COUPLING

Raymond A. Carlson and Benjamin A. Swennes, Rockford, Ill., assignors to Borg-Warner Corporation, Chicago, Ill., a corporation of Illinois Original application March 6, 1940, Serial No. 322,440, now Patent No. 2,304,336, dated December 8, 1942. Divided and this application November 6, 1942, Serial No. 464,746

2 Claims. (Cl. 60—54)

This application constitutes a division of our pending application Serial No. 322,440, filed March 6, 1940, now Patent No. 2,304,336, granted December 8, 1942.

The invention relates to hydrodynamic power transmitting devices and has as its general object to provide such a power transmitting device which is suitable for heavy duty work.

The invention deals specifically with the problem of fatigue failure in the impeller and runner of a hydrodynamic power transmitting device, caused by the weaving action developed by the varying stresses to which they are subjected in operation. In this connection, the invention aims to provide a power transmitting device having maximum accuracy and efficiency in the shaping of the vanes, combined with maximum resistance to fatigue failure.

Another object of the invention is to provide an improved hydrodynamic power transmitting device which, in addition to the above characteristics, is of relatively simple and efficient construction.

These and other objects and features of the invention will become apparent from the following specification when taken together with the accompanying drawings in which:

Fig. 1 is a side elevation in section of the novel hydrodynamic transmitting device; and Fig. 2 is a rear elevation, partly in section, of the hydrodynamic device showing the arrangement of the vanes.

One of the most desirable characteristics of a hydrodynamic coupling is its ability to absorb shock. This characteristic makes such a coupling particularly desirable for use in industrial equipment such as cranes, derricks, hoists, power-operated shovels, tractors, etc., where heavy loads are picked up quickly and dropped just as quickly. The internal combustion engines used with such devices do not employ starters of a type generally used in automobiles and trucks and hence the ring gear and flywheel usually found on the crank shaft may be modified considerably.

In accordance with our invention, a hydrodynamic coupling for such use can be simplified considerably by reversing the positions of the impeller and runner so that the impeller is nearest the engine and driving shaft and the runner is nearest the driven shaft and is provided with a shroud which surrounds the impeller. In the illustrative embodiment of the invention shown herein, we have disclosed such an arrangement, wherein the numeral 10 indicates the drive shaft of an internal combustion engine such as a gasoline or Diesel engine, and the numeral 11 indicates a driven shaft which is connected by suitable means (not shown) to the load. The shafts 10 and 11 are coupled together by means of our improved hydrodynamic coupling designated generally by the reference character 16.

The coupling 16 comprises an impeller or driving element 17 and a runner or driven element 18 having toroidal walls 19 and 20 cooperating to define a chamber in which the fluid is circulated back and forth between the impeller and runner.

In the operation of the device, axially opposed stresses are set up between the impeller and runner through the medium of the circulating fluid, which stresses will vary in accordance with the load being transmitted. Under these stresses, there is a tendency for the impeller and runner to weave, producing severe strains near the axis of rotation. Where one of the vaned members is connected directly to its corresponding shaft through a relatively small diameter hub, these strains create a serious problem of fatigue failure in the region near the axis of rotation. It may be noted at this point that the invention contemplates the mounting of the runner 18 directly on the driven shaft 11 through the medium of a relatively small diameter flanged hub 23.

The invention contemplates that the vanes of the impeller and runner may be of a high degree of efficiency and accuracy. For the highest efficiency, the shape of the vanes is calculated to a very close degree of exactness, and in order to achieve the particular shape thus calculated, with the desired high degree of accuracy, we propose to form the vanes by a casting process. At the same time, we achieve the desired high degree of resistance to fatigue breakdown by supporting the runner member 18 on a disc 22 of relatively tough strain-resisting metal which forms the connection to the hub 23 by means of which the runner is secured to the driven shaft 11. We prefer to employ stamped sheet steel as the material of the disc 22. Such material has sufficient flexibility combined with toughness to absorb the weaving stresses without fatigue failure.

The hub 23 is welded as at 24 and 25 to the shaft 11, and at 26 and 27 to the disc 22, thereby forming a strong and fluid tight connection. The runner 18 is riveted at 21 to the disc 22, and the disc 22 is shaped to conform to the curvature of the toroidal wall 20 of the runner, and is in supporting contact therewith.

To the disc 22 is secured, as by means of bolts, a toroidal wall member 28 of sheet steel which forms, together with the disc 22, a shroud surrounding both of the vaned members 17 and 18. The wall member 28 extends forwardly toward the engine and has a cylindrical seal container 29 formed at the inner periphery thereof. The container 29 contains a seal, as shown, by means of which the shroud is sealed to the fixed collar 33.

The impeller 17 has a collar 30 formed integrally therewith by means of which it is fixed upon the driving shaft 10. Between the bearing 12 and the impeller 17 is a pump 31 which serves to maintain sufficient amount of fluid within the coupling 16 to maintain the drive therethrough. The pump 31 comprises a series of radial vanes 32 which cooperate with a fixed collar 33 having inlet and outlet openings 34 and 35 respectively, for the passage of the fluid. The opening 35 is aligned with an annular opening 36 formed in the impeller 17 by a conical flange 37 of the outer shell 19. The opening 34 is defined by an inwardly depending flange 38 in the collar 33 which serves as a partition between the pump vanes 32 and the inlet chamber 39. The chamber 39 communicates by means of passageways 40 and 41 with a tube 42 which in turn passes into the crank case 13 having the usual oil reservoir 44.

The driven shaft 11 is piloted at 45 in the driving shaft 10 by means of a bearing 46. Excess oil in the coupling 16 forces its way inwardly between the disc 22 and the rearward end of the collar 30, thence through bearings 46 into a centrally located outlet passage 47 in the drive shaft 10. At the right-hand end (Fig. 1) of passageway 47 is a spring-loaded ball valve 48 in which is a small aperture 49. The valve 48 is adjustable so that the amount of pressure placed upon the oil in the passage 47 may be changed as desired.

We claim:

1. A hydro-dynamic device for transmitting power from a drive shaft to a driven shaft, said device comprising cast metal vaned members in hydraulic communication with each other, means for securing one of said members to one of said shafts, and means for securing the other of said members to the other of said shafts, said last named means comprising a disc of stamped relatively tough strain resisting sheet metal which is mounted on said other shaft and on which said other member is mounted, said disc and said other vaned member having conforming toroidal walls with the walls of the former being in supporting contact with the walls of the latter.

2. A hydro-dynamic device for transmitting power from a drive shaft to a driven shaft, said device comprising cast metal vaned members in hydraulic communication with each other, means for securing one of said members to one of said shafts, and means for securing the other of said members to the other of said shafts, said last named means comprising a disc of stamped relatively tough strain resisting sheet steel which is mounted on said other shaft and on which said other member is mounted, said disc comprising a shroud surrounding both of said vaned members and having conforming toroidal walls with the walls of said other vaned member with the walls of the disc being in supporting contact with the walls of said other member.

RAYMOND A. CARLSON.
BENJAMIN A. SWENNES.